(12) United States Patent
Dewanjee et al.

(10) Patent No.: US 8,003,747 B2
(45) Date of Patent: Aug. 23, 2011

(54) CROSS-LINKED THERMOPLASTIC POLYURETHANE/POLYUREA AND METHOD OF MAKING SAME

(75) Inventors: Pijush K. Dewanjee, Carlsbad, CA (US); John G. Guard, Oceanside, CA (US)

(73) Assignees: Callaway Golf Company, Carlsbad, CA (US); PriPro Polymers, Inc., Carlsbad, CA (US)

( * ) Notice: Subject to any disclaimer, the term of this patent is extended or adjusted under 35 U.S.C. 154(b) by 502 days.

(21) Appl. No.: 12/184,394

(22) Filed: Aug. 1, 2008

(65) Prior Publication Data

US 2008/0287639 A1   Nov. 20, 2008

Related U.S. Application Data

(62) Division of application No. 10/992,907, filed on Nov. 18, 2004, now Pat. No. 7,417,094.

(51) Int. Cl.
*C08G 18/08*   (2006.01)

(52) U.S. Cl. ............ 528/64; 524/509; 473/378; 528/61; 525/457

(58) Field of Classification Search .................. None
See application file for complete search history.

(56) References Cited

U.S. PATENT DOCUMENTS

| | | |
|---|---|---|
| 3,084,004 A | 4/1963 | Henley |
| 3,218,215 A | 11/1965 | Havens et al. |
| 3,387,074 A | 6/1968 | Hill |
| 3,427,346 A | 2/1969 | Brotherton et al. |
| 3,472,826 A | 10/1969 | Potts et al. |
| 3,499,852 A * | 3/1970 | Krawczyk et al. ............ 528/45 |
| 3,542,718 A | 11/1970 | Brizgys et al. |
| 3,845,021 A | 10/1974 | Dukes et al. |
| 4,066,397 A | 1/1978 | Carroll |
| 4,107,101 A | 8/1978 | Kubens |
| 4,195,132 A | 3/1980 | Sundermann et al. |
| 4,247,354 A | 1/1981 | Ward et al. |
| 4,265,798 A | 5/1981 | Mishra |
| 4,438,225 A | 3/1984 | Peerman |
| 4,605,681 A | 8/1986 | Grey et al. |
| 4,748,194 A | 5/1988 | Geeck |
| 4,786,657 A | 11/1988 | Hammar et al. |
| 4,944,880 A | 7/1990 | Ho et al. |
| 4,975,207 A | 12/1990 | Lee |
| 4,980,445 A | 12/1990 | Van Der Wal et al. |
| 5,019,319 A | 5/1991 | Nakamura et al. |
| 5,028,685 A | 7/1991 | Ho et al. |
| 5,112,556 A | 5/1992 | Miller |
| 5,334,673 A | 8/1994 | Wu |

(Continued)

*Primary Examiner* — John J Figueroa
(74) *Attorney, Agent, or Firm* — Michael A. Catania; Rebecca Hanovice; Sonia Lari

(57) ABSTRACT

A cross-linked thermoplastic polyurea is formed by heating a mixture containing a thermoplastic urethane base material, a monomeric and/or polymeric di-isocyanate comprising between 1 to 10% of the total weight of the mixture, and a diamine comprising between 1 to 10% of the total weight of the mixture. A thermoplastic polyurethane may be formed by substituting hydroquinone for the diamine. The mixture is heated to a temperature within the range of 250° F. to 550° F. The heated mixture, which is flowable, is then injected into at least one injection molding device. The mixture is then cured at a temperature between 150° F. to 250° F. for a period of time between 2 and 36 hours. The cross-linked thermoplastic polyurethane/polyurea retains the excellent flowability characteristics of a thermoplastic urethane while the same time exhibits good abrasion, tensile strength, rebound, and compression set characteristics which are similar to those found in thermoset urethanes.

2 Claims, 1 Drawing Sheet

U.S. PATENT DOCUMENTS

| | | |
|---|---|---|
| 5,356,149 A | 10/1994 | Kane |
| 5,484,870 A | 1/1996 | Wu |
| 5,516,873 A | 5/1996 | Hicks et al. |
| 5,559,204 A | 9/1996 | Squiller et al. |
| 5,589,543 A | 12/1996 | Yokelson et al. |
| 5,589,546 A | 12/1996 | Hiraoka et al. |
| 5,674,137 A | 10/1997 | Maruko et al. |
| 5,721,304 A | 2/1998 | Pasque, Jr. |
| 5,744,549 A | 4/1998 | Lutz |
| 5,779,562 A | 7/1998 | Melvin et al. |
| 5,792,803 A | 8/1998 | Savin |
| 5,800,286 A | 9/1998 | Kakiuchi et al. |
| 5,803,831 A | 9/1998 | Sullivan et al. |
| 5,833,553 A | 11/1998 | Sullivan et al. |
| 5,879,244 A | 3/1999 | Hwang |
| 5,908,894 A | 6/1999 | Genz et al. |
| 5,929,170 A | 7/1999 | Kawabata et al. |
| 5,929,189 A | 7/1999 | Ichikawa et al. |
| 6,037,440 A | 3/2000 | Wilson et al. |
| 6,075,113 A | 6/2000 | Masterman et al. |
| 6,116,166 A | 9/2000 | Taylor et al. |
| 6,123,628 A | 9/2000 | Ichikawa et al. |
| 6,190,268 B1 * | 2/2001 | Dewanjee ................ 473/370 |
| 6,207,752 B1 | 3/2001 | Abraham et al. |
| 6,224,526 B1 | 5/2001 | Stimmelmayr et al. |
| 6,355,406 B2 | 3/2002 | Majumdar et al. |
| 6,559,263 B1 | 5/2003 | Benecke et al. |
| 6,565,969 B1 | 5/2003 | Lamon et al. |
| 6,582,325 B1 | 6/2003 | Ichikawa et al. |
| 6,616,797 B1 | 9/2003 | Licht et al. |
| 6,716,954 B2 | 4/2004 | Keller et al. |
| 6,943,213 B2 * | 9/2005 | Kuntimaddi ................ 525/127 |
| 6,989,431 B2 | 1/2006 | Rajagopalan et al. |
| 7,037,985 B2 | 5/2006 | Kim et al. |
| 7,041,007 B2 | 5/2006 | Boehm et al. |
| 7,417,094 B2 | 8/2008 | Dewanjee et al. |
| 2003/0064833 A1 | 4/2003 | Ichikawa et al. |
| 2003/0065124 A1 | 4/2003 | Rosenberg et al. |
| 2004/0181014 A1 * | 9/2004 | Kim et al. ................ 525/455 |

* cited by examiner

CROSS-LINKED THERMOPLASTIC POLYURETHANE/POLYUREA AND METHOD OF MAKING SAME

CROSS REFERENCES TO RELATED APPLICATIONS

The Present Application is a divisional application of U.S. patent application Ser. No. 10/992,907, filed on Nov. 18, 2004, issued as U.S. Pat. No. 7,417,094 B2 Aug. 26, 2008.

STATEMENT REGARDING FEDERALLY SPONSORED RESEARCH OR DEVELOPMENT

Not Applicable

BACKGROUND OF THE INVENTION

1. Field of the Invention

The field of the invention generally relates to thermoplastic polyurethanes and thermoplastic polyureas having properties similar to those of castable or cross-linked polyurethanes or polyureas. The field of the invention also includes methods of making the same.

2. Description of the Related Art

There currently are a number of commercialized products made from polyurethanes and polyureas. Typically, these products made from either thermoplastic polyurethanes (or polyureas) or thermoset polyurethanes (or polyureas). Thermoplastic polyurethanes generally have linear molecular structures and are able to flow freely at elevated temperatures. For this reason, thermoplastic polyurethanes are preferred for products which are produced by injection molding or other extrusion techniques, where flowability of the reactants are of paramount importance. Unfortunately, thermoplastic polyurethanes typically exhibit poor performance characteristics with respect to abrasion, tensile strength, rebound, and compression set compared to castable polyurethanes.

In contrast to current thermoplastic polyurethanes, thermoset polyurethanes have particularly good characteristics with respect to abrasion, tensile strength, rebound, and compression set. Thermoset polyurethanes generally have a network structure that incorporates irreversible chemical cross-linking. The downside of thermoset polyurethanes is that the irreversible chemical cross-linking reaction makes it unsuitable for use in injection molding and extrusion applications. Typically, thermoset polyurethanes are formed using a casting process. Unfortunately, casting processes require costly equipment and usually involve a large number of processing steps. Casting is thus a less efficient and more expensive method of producing polyurethane-based and polyurea-based products as compared to injection molding and extrusion systems.

In a typical process for making a thermoset (i.e., castable) polyurethane, a di-isocyanate component is first pre-polymerized with a polyol having either a polyester or polyether backbone. The remaining di-isocyanate of the pre-polymer is reacted with a chain extender or a cross-linking agent or a blend of cross-linking agents. Catalysts are added to control the reaction rate. If the cross-linking agent has a dihydroxy functional component, a polyurethane will be formed. If the cross-linking agent has diamine functionality, a polyurea is formed.

With respect to thermoplastic polyurethanes, a diol or polyol is reacted with an isocyanate. This reaction typically takes place in large commercial reactors. As stated above, thermoplastic polyurethanes, while not cross-linked, are usable in injection molding and other extrusion methods. Because of the lack of cross-linking, these materials have abrasion, tensile, and compression set properties that are not as good as thermoset polyurethane or polyurea systems.

There thus is a need for a thermoplastic polyurethane or polyurea material which exhibits good abrasion, tensile strength, rebound, and compression set characteristics which are similar to those found in thermoset urethanes. Such a material could be produced using conventional injection molding and/or extrusion techniques, thereby reducing the cost of manufacture for the material.

BRIEF SUMMARY OF THE INVENTION

In one aspect of the invention, a cross-linked thermoplastic polyurea includes a mixture of thermoplastic urethane base material, a monomeric di-isocyanate comprising between 1 to 10% of the mixture on a total weight basis, and a diamine comprising between 1 to 10% of the mixture on a total weight basis.

In another aspect of the invention, a method of making a cross-linked thermoplastic polyurea is provided. The method includes the steps of providing a mixture containing a thermoplastic urethane base material, a monomeric and/or a polymeric di-isocyanate comprising between 1 to 10% of the total weight of the mixture, and a diamine comprising between 1 to 10% of the total weight of the mixture. The mixture is then heated to a temperature within the range of 250° F. to 550° F. The heated mixture is then injected into at least one injection molding device. Post-injection, the material is cured at a temperature between 150° F. to 250° F. for a period of time between 2 and 36 hours.

In another aspect of the invention, a cross-linked thermoplastic polyurethane includes a mixture of thermoplastic urethane base material, a monomeric di-isocyanate comprising between 1 to 10% of the mixture on a total weight basis, and hydroquinone comprising between 1 to 10% of the mixture on a total weight basis.

It is an object of the invention to provide a thermoplastic polyurethane or polyurea material which exhibits good abrasion, tensile strength, rebound, and compression set characteristics which are similar to those found in thermoset urethanes. It is a further object of the invention to provide a method of producing such a material using conventional injection molding and/or extrusion techniques. Additional objects of the invention are disclosed below.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
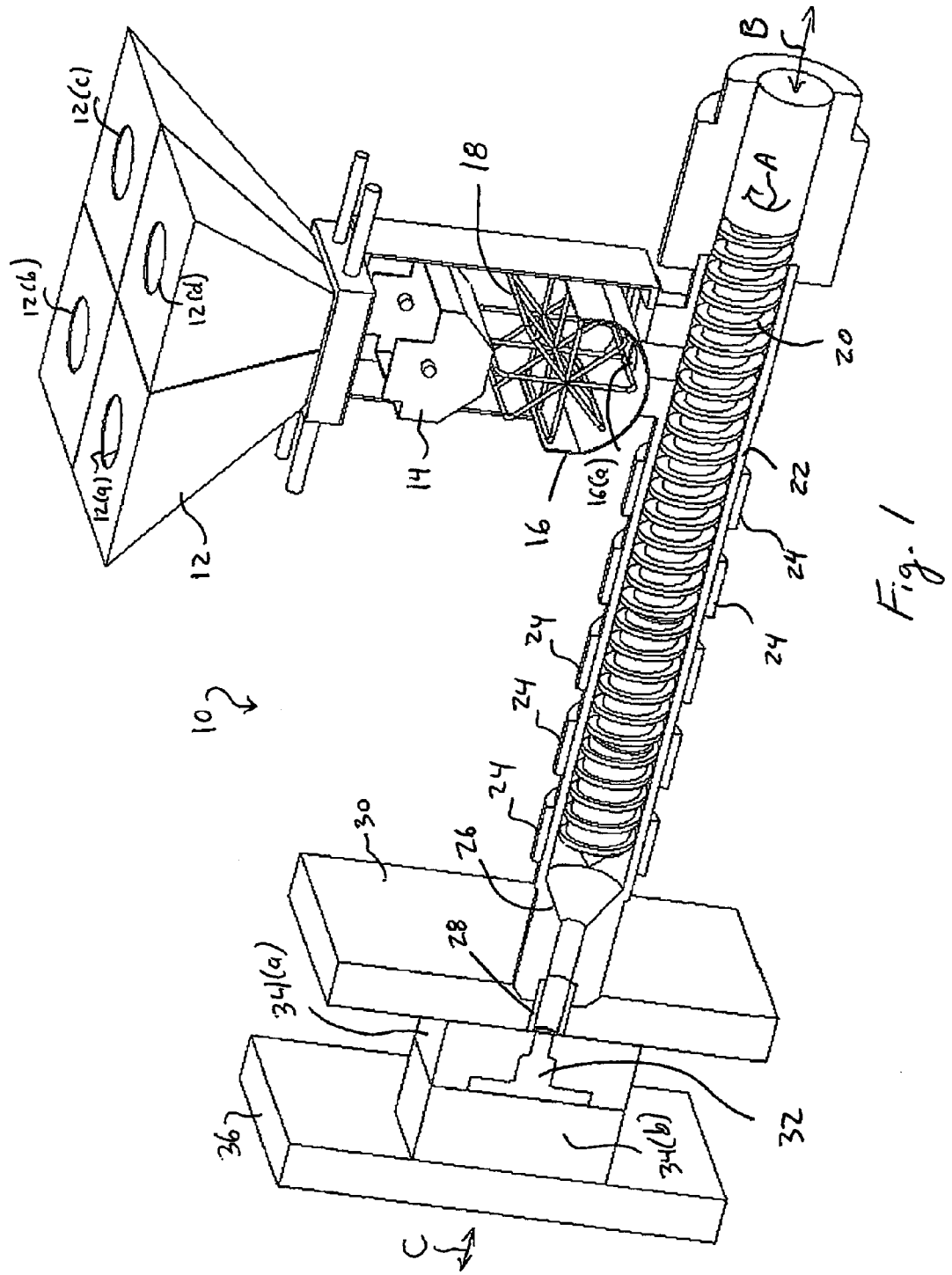
FIG. 1 schematically illustrates an injection molding device which can be used to produce products made from cross-linked thermoplastic polyurethanes/polyureas according to the present invention.

A cross-linked thermoplastic polyurethane or polyurea is formed using a polyester or polyether backbone material. The polyester or polyether base material can include, for example, commercial grade thermoplastic urethanes. For instance, the thermoplastic urethane base material may include TEXIN 985, an aromatic polyether-based thermoplastic polyurethane having a Shore hardness of about 85. TEXIN 985 can be obtained from Bayer Corporation, 100 Bayer Road, Pittsburgh, Pa. 15205. As another example, the thermoplastic urethane base material may include NOVEON ST80A, which is available from Noveon, Inc., 9911 Brecksville Road, Cleveland, Ohio 44141-3247.

The thermoplastic urethane base material is preferably dried prior to adding the additional components described in detail below. This can be accomplished, for example, by heating thermoplastic base material to a temperature between about 100° F. to 200° F. in a separate container.

A monomeric di-isocyanate (MDI) is added to the dried thermoplastic urethane base material. Preferably, the MDI used in the process is a solid at room temperature. In one preferred aspect of the invention, the MDI is 4,4' diphenylmethane di-isocyanate. This can be commercially obtained from Bayer Corporation under the trade name, MONDUR M (CAS No. 101-68-8). Preferably, the flaked or fused form of MONDUR M is used in connection with the process described herein. The MDI is preferably stored at about −20° C. By adding MDI to the thermoplastic urethane base material, isocyanate functionality is added to the system. Other Di-isocyanate materials which are solid at room temperature and may be used in accordance with the invention include: Toluene Di-isocyanates (TDI), Toluene ortho Di-isocyanates (TODI), Naphthalene Di-isocyanates (NDI), Hydrogenated Methylene Di-isocyantaes (H12MDI), Iso Phorone Di-isocyanates (IPDI), Hexamethylene Di-isocyantes (HDI). These isocyanate-based compounds can be made in solid crystalline form suitable for dry blending. These isocyanates can also be added in the liquid and semi-liquid form.

Preferably, MDI comprises between 1% to 10% of the total weight of the mixture forming the cross-linked thermoplastic polyurethane/polyurea. Even more preferably, MDI comprises between 1% to 2% of the total weight of the mixture forming the cross-linked thermoplastic polyurethane/polyurea. MDI materials other than those specifically identified above may also be used in accordance with the invention, provided they exist as a solid at room temperature.

The cross-linked thermoplastic urethane also includes a diamine which is used to cross-link the liquid thermoset urethane. One preferred diamine is 4,4' methylene-bis-(3-chloro-2,6-diethylaniline), available commercially as LONZACURE M-CDEA (CAS No. 106246-33-7). Another diamine which can be employed with the present invention is 4,4' Methylene-bis-(2,6-diethylaniline), available commercially as LONZACURE M-DEA (CAS No. 13680-35-8). Both diamines have melting points at approximately 90° C. Preferably, the diamine is added in solid form and dry blended with the MDI and thermoplastic urethane base material. Alternative cross-linking agents and other solid or crystalline Diamines which may be used in the present invention include: MOCA (4,4'-Methylenebis-(O-Chloroaniline)), MDA (Methylene Dianiline), as well as any other methylene bis aniline like LONZACURE M-CDEA described above. Any other diamine-based compounds can be made in solid crystalline form suitable for dry blending can also be used. The diamines above can also be added in the liquid or semi-liquid form.

Preferably, diamine comprises between 1% to 10% of the total weight of the mixture forming the cross-linked thermoplastic polyurea. Even more preferably, diamine comprises between 1% to 2% of the total weight of the mixture forming the cross-linked thermoplastic polyurea. Diamines other than those specifically identified above may also be used in accordance with the invention, provided they exist as a solid at a temperature within the range of 50° F. to 150° F.

In an alternative embodiment, hydroquinone (HQEE) replaces the diamine constituent and is added to the mixture of MDI and thermoplastic urethane. As with the prior embodiment, HQEE is added to the mixture in solid form and dry blended with the MDI and thermoplastic urethane base material. In yet another alternative embodiment, HQEE is added in conjunction with a diamine.

The mixture of thermoplastic urethane base material, MDI, and diamine (and/or HQEE) is then mixed and heated to a temperature within the range of 250° F. to 550° F. The solid thermoplastic urethane base material, MDI, and diamine (and/or HDEE) melt and partially cross-link. Preferably, the partially cross-linked thermoplastic polyurethane/polyurea is post-cured by heating the same to a temperature within the range of 150° F. to 250° F. for a period of time ranging between 2 and 36 hours.

FIG. 1 illustrates an injection molding device 10 capable of producing cross-linked thermoplastic polyurethanes/polyureas in accordance with the present invention. The injection molding device 10 includes a hopper 12 for loading the various components (i.e., thermoplastic urethane base material, MDI, and diamine/HQEE). As shown in FIG. 1, the hopper 12 is preferably partitioned into a plurality of separate bins 12(a), 12(b), 12(c), 12(d) for loading the various components in the mixture.

A weight chamber 14 is positioned underneath the hopper 12 for measuring the weight of the materials being added via the various bins (e.g., 12(a), 12(b), 12(c), 12(d)). A mixing chamber 16 is positioned beneath the weight chamber 14 and includes a rotating mixer 18 therein for dry mixing the constituents for the cross-linked thermoplastic urethane/urea.

The mixing chamber 16 communicates with screw 20 via a port 16(a). The screw 20 is disposed inside a mixing barrel 22. The screw 20 both rotates and reciprocates within the mixing barrel as is shown by arrows A and B, respectively. A plurality of heating bands 24 are disposed circumferentially around the mixing barrel 22 to heat the mixture as it travels along the screw 20. The plurality of heating bands 24 create a plurality of heating zones along the length of the screw 20. Preferably, the heating bands 24 can each be independently controlled to create differential temperatures along the length of the screw 20. For example, a temperature gradient may be established along the length of the screw 20 during operation of the device 10. The distal end of the mixing barrel 22 terminates into an injection chamber 26 and injection nozzle 28. The injection nozzle 28 is disposed inside a stationary platen 30 and communicates with a sprue bushing and runner 32 in one of two separable mold plates 34(a), 34(b). Mold plate 34(a) is affixed or stationary with respect to stationary platen 30. In contrast, mold plate 34(b) is affixed to moveable platen 36. Moveable platen 36 is moveable in the direction of arrow C shown in FIG. 1.

The mold plates 34(a), 34(b) include one or more cavities (not shown) having a pre-formed shape. The injection molding device 10 may be used to form any number of products including, for example, skateboard wheels, in-line skate wheels, roller coaster wheels, caster wheels, castable urethane. Products in the automotive industry such as seals, O-rings, gaskets, bushings, CV-joint cover, and tires may also be made using the methods described herein. For agricultural applications, the methods can be used in silo liners, plow parts, pipe, and pipe liners. The invention also has utility in mining applications, where the methods and processes described herein can be used to produce mining screens, material moving buckets, pump parts and liners, pulleys, and bumpers. The materials and methods can also be used in footwear applications such as, for example, shoe soles and the like. The invention can also be used in general purpose applications such as press pads, abrasion-resistant silo or hopper liner sheets, gears, hammers, metal forming parts, etc.

The methods and materials described herein are applicable to any cast-based, injection mold-based, or extrusion-based process which require a thermoplastic urethane with good abrasion, tensile strength, rebound, and compression set characteristics which are similar to those found in thermoset urethanes.

With reference to FIG. 1, the various mixture constituents are added to the hopper bins 12(a)-12(d). The constituents are weighed in the weight chamber 14 and mixed inside the mixing chamber 16. The mixed material then passes to the mixing barrel 22. Preferably, the temperature of the barrel zones (those portions of the mixing barrel 22 adjacent to the heating bands 24) are kept within the range of 250° F. to 550° F. The injection nozzle 28 is also preferably kept at a temperature within the range of 250° F. to 550° F. While the constituents pass through the screw 20, they melt and partially cross-link.

After the melted mixture is injected into the mold cavities (not shown), the moveable mold plate 34(b) is moved in the direction of arrow C to open the cavity. The product is then removed and cured by heating the same at a temperature within the range of 160° F. to 230° F. for 6 to 18 hours.

The injection molding cycle time using the above-described cross-linked polyurethane/polyurea is very fast when compared to the conventional cycle time of a castable thermoset method. The equipment and ancillary tooling needed to produce products made by injection molding (i.e., FIG. 1) is much less when compared to casting methods. For example, a four-cavity injection molding tool on a 200-ton machine could produce, with a single operator, as many parts as six operators using over 60 casting tools with a single cavity each. Enormous efficiencies are gained in injection molding systems as compared to current casting-based systems.

The cross-linked thermoplastic polyurethane/polyurea described herein is able to be efficiently (and cheaply) produced using injection molding technology without sacrificing performance characteristics.

The following are experimental test results of various cross-linked thermoplastic urethanes/ureas in accordance with the present invention.

Experiment 1

In this experiment, TEXIN 985 was used as the thermoplastic urethane base material. Different amounts of MDI in the form of MONDUR M were added to the mixture (ranging from 1% to 2% by weight of the total mixture). Diamine in the form of LONZACURE M-CDEA was also added to the mixture (in amounts ranging from 1% to 2% by weight of the total mixture). The barrel zone temperature was set at 380° F. (ejection nozzle). The remaining zones where set to 390° F. The material was post-cured at 200° F. for 12 hours.

Table 1 listed below illustrates the performance characteristics of the control (100% thermoplastic urethane base material) as well as three various weight percentages of MONDUR M and LONZACURE M-CDEA.

TABLE 1

| | | A | B | C | D | |
| | | \multicolumn{4}{c|}{Bayer Testing Reference Numbers} | |
| | | NB 893029A | NB 893029B | NB 893029C | NB 893029D | |
| | | \multicolumn{4}{c|}{Percent of Base and Additives} | |
| | Bayer Stated Mechanical Properties | Base: 100% (Control) | Base: 100% Add-1: 1% Add-2: 1% | Base: 100% Add-1: 1% Add-2: 2% | Base: 100% Add-1: 2% Add-2: 2% | Present Improvement Over Stated Properties |
|---|---|---|---|---|---|---|
| Hardness, Shore A | 85 | 78 | 80 | 78 | 81 | −4.71% |
| Taber Abrasion, mg loss H-18 Wheel, 1000 g Load, 1000 Cycles | 30 | 13 | 13 | 8.0 | 3.5 | 88.33% |
| Bayshore Resilience, % | 45 | 47.8 | 44.8 | 42.6 | 41.0 | −8.89% |
| Tensile Strength, psi | 5,500 | 4,084 | 4,425 | 4,623 | 4,594 | −16.47% |
| Tensile Stress @ 100% Elongation, psi | 800 | 770 | 794 | 845 | 889 | 11.13% |
| Tensile Stress @ 300% Elongation, psi | 1200 | 1,258 | 1,375 | 1,565 | 1,675 | 39.58% |
| Ultimate Elongation, % | 500 | 661 | 578 | 484 | 478 | −4.40% |
| Compression Set, % | | | | | | |
| 22 Hours @ 23° C. | 16 | 10.8 | 3.7 | 2.0 | 2.2 | 86.25% |
| 22 Hours @ 70° C. | 40 | 24.6 | 19.2 | 19.4 | 13.7 | 65.75% |

Base: TEXIN 985
Add-1: MONDUR M
Add-2: LONZACURE M-CDEA

Experiment 2

In this experiment, TEXIN 985 was again used as the thermoplastic urethane base material. Different amounts of MDI in the form of MONDUR M were added to the mixture (ranging from 1% to 2% by weight of the total mixture). Diamine in the form of either LONZACURE M-CDEA or LONZACURE M-DEA was also added to the mixture in amounts ranging from 1% to 2% by weight of the total mixture. HQEE was added in several runs ranging from 1% to 2% by weight of the total mixture (runs C, E, and F). Table 2 below illustrates the results of this experiment.

TABLE 2

| | Bayer Stated Mechanical Properties for Texin 985 | A NB 893044A Texin 985 Base: 100% (Control) | B NB 893044B Texin 985 Base: 100% Add-1: 2% Add-2: 2% Add-3: 0% Add-4: 0% | C NB 893044C Texin 985 Base: 100% Add-1: 2% Add-2: 0% Add-3: 0% Add-4: 2% | D NB 893044D Texin 985 Base: 100% Add-1: 2% Add-2: 0% Add-3: 2% Add-4: 0% | E NB 893044E Texin 985 Base: 100% Add-1: 2% Add-2: 1% Add-3: 0% Add-4: 1% | F NB 893044F Texin 985 Base: 100% Add-1: 2% Add-2: 0% Add-3: 1% Add-4: 1% |
|---|---|---|---|---|---|---|---|
| Shore Hardness, A Scale | 85 | 81 | 83 | 85 | 85 | 84 | 84 |
| Taber Abrasion, mg loss H-18 Wheel, 1000 g Load, 1000 Cycles | 30 | 30.8 | 16.3 | 36.0 | 18.0 | 26.8 | 38.8 |
| Bayshore Resilience, % | 45 | 51.0 | 49.0 | 46.6 | 50.2 | 49.0 | 46.8 |
| Tensile Strength, psi | 5,500 | 3,277 | 3,833 | 4,021 | 3,507 | 3,508 | 3,545 |
| Tensile Stress @ 100% Elongation, psi | 800 | 788 | 831 | 842 | 842 | 834 | 835 |
| Tensile Stress @ 300% Elongation, psi | 1200 | 1,299 | 1,466 | 1,580 | 1,404 | 1,558 | 1,469 |
| Ultimate Elongation, % | 500 | 677 | 563 | 552 | 635 | 558 | 602 |
| Compression Set, % | | | | | | | |
| 22 Hours @ 23° C. | 16 | 15.2 | 13.6 | 15.7 | 14.6 | 13.8 | 10.8 |
| 22 Hours @ 70° C. | 40 | 35.5 | 38.5 | 33.2 | 38.1 | 37.6 | 50.8 |

Base: Texin 985
Add-1: Mondur M, Add-2: Lonzacure MCDEA, Add-3 Lonzacure MDEA, Add-4 HQEE.

In this particular experiment, during mixing of the additives to the thermoplastic urethane base material, a static charge was present in the air and portions of the additives did not mix into the thermoplastic urethane base material. Consequently, the improvements in performance characteristics were not as dramatic as those in experiment 1. However, by comparing the Taber Abrasion results for those runs with at least 2% diamine, a reduction of at least approximately 50% was seen in Taber Abrasion values.

Experiment 3

In this experiment, NOVEON ST80A was used as the thermoplastic urethane base material. MDI in the form of MONDUR M was added to the mixture (2% by weight of the total mixture). Diamine in the form of either LONZACURE M-CDEA or LONZACURE M-DEA was also added to the mixture in amounts ranging from 1% to 2% by weight of the total mixture. HQEE was added in several runs ranging from 1% to 2% by weight of the total mixture (runs I, K, and L). Table 3 below illustrates the results of experiment 3.

TABLE 3

| | Noveon Stated Mechanical Properties for ST80A | G NB 893044G ST80A Base: 100% (Control) | H NB 893044H ST80A Base: 100% Add-1: 2% Add-2: 2% Add-3: 0% Add-4: 0% | I NB 893044I ST80A Base: 100% Add-1: 2% Add-2: 0% Add-3: 0% Add-4: 2% | J NB 893044J ST80A Base: 100% Add-1: 2% Add-2: 0% Add-3: 2% Add-4: 0% | K NB 893044K ST80A Base: 100% Add-1: 2% Add-2: 1% Add-3: 0% Add-4: 1% | L NB 893044L ST80A Base: 100% Add-1: 2% Add-2: 0% Add-3: 1% Add-4: 1% |
|---|---|---|---|---|---|---|---|
| Shore Hardness, A Scale | | 77 | 80 | 81 | 80 | 80 | 79 |
| Taber Abrasion, mg loss H-18 Wheel, 1000 g Load, 1000 Cycles | | 27.8 | 13.0 | 18.8 | 12.8 | 37.3 | 20.3 |
| Bayshore Resilience, % | | 74.2 | 74.0 | 71.4 | 71.0 | 71.4 | 68.6 |
| Tensile Strength, psi | | 2,450 | 3,580 | 1,541 | 2,467 | 2,423 | 1,552 |
| Tensile Stress @ 100% Elongation, psi | | 538 | 630 | 571 | 606 | 601 | 568 |
| Tensile Stress @ 300% Elongation, psi | | 1,039 | 1,222 | 1,067 | 1,157 | 1,136 | 1,033 |
| Ultimate Elongation, % | | 760 | 662 | 612 | 698 | 708 | 685 |
| Compression Set, % | | | | | | | |
| 22 Hours @ 23° C. | | 9.5 | 8.9 | 11.8 | 10.0 | 11.8 | 14.0 |
| 22 Hours @ 70° C. | | 24.8 | 20.8 | 30.2 | 37.0 | 24.6 | 32.6 |

Base: NOVEON ST80A
Add-1: MONDUR M
Add-2: LONZACURE M-CDEA
Add-3: LONZACURE M-DEA
Add-4: HQEE In experiment 3, as with experiment 2, during mixing of the additives to the thermoplastic urethane base material, a static charge was present in the air and portions of the additives did not mix into the thermoplastic urethane base material. Thus, the improvement in performance parameters was not as significant as those seen in experiment 1. Nonetheless, as seen in columns H, I, and J above in Table 3, Taber Abrasion was reduced by approximately half as compared to the control.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as are invention the following:

1. A method of making a cross-linked thermoplastic polyurea comprising the steps of:

heating a dry mixture to a temperature within the range of 250° F. to 550 ° F. within a mixing barrel to created a heated partially cross-linked mixture, the dry mixture comprising a thermoplastic urethane base material, a di-isocyanate comprising between 1 to 10% of the total weight of the mixture, the di-isocyanate being one of monomeric or polymeric, and a diamine comprising between 1 to 10% of the total weight of the mixture, the diamine selected from the group consisting of 4, 4' methylene-bis-(3-chloro-2, 6-diethylaniline) and 4, 4' methylene-bis-(2, 6-diethylaniline);

injecting the heated partially cross-linked mixture into at least one injection mold cavity; and curing the injected material at a temperature between 150° F. to 250° F. for a period of time between 2 and 36 hours.

2. The method of claim 1 wherein the di-isocynate comprises 4, 4' diphenylmethane di-isocyanate.

\* \* \* \* \*